3,207,568
AZO AND ANTHRAQUINONE DYE MIXTURE, DYEING CELLULOSE ACETATE AND POLYESTERS THEREWITH AND THE PRODUCT OF SUCH DYEING
Urs Lerch, Neu-Allschwil, Ernest Merian, Bottmingen, and Otto Senn, Arlesheim, Switzerland, assignors to Sandoz Ltd., Basel, Switzerland
No Drawing. Filed Dec. 19, 1963, Ser. No. 331,920
Claims priority, application Switzerland, June 9, 1960, 6,557/60
8 Claims. (Cl. 8—26)

This application is a continuation-in-part of application Serial No. 115,081, filed June 6, 1961, now abandoned.

In order to dye polyester fibers and articles of these fibers in level grey, brown or olive shades, it is necessary to use mixtures of disperse dyes. Mixtures of fast-to-light yellow, red and blue dyes, however, give dyeings of comparatively poor light fastness which are apt to change shade, or the pleating and sublimation fastness is not satisfactory. Almost all the known yellow dyes of this class are more or less destroyed in mixture with blue dyes. While nitro dyes are free from this disadvantage, their tinctorial strength is rather poor and they can only be used for light fashion shades. Dye mixtures containing blue nitrated anthraquinone dyes change shade to green on exposure to light.

It has now been found that these disadvantages in the dyeing of fibers and fiber materials of polyesters and also of cellulose acetate can be avoided when the substrate is dyed, padded or printed, simultaneously or in any order, with dyes of the general formulae

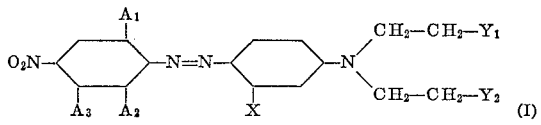

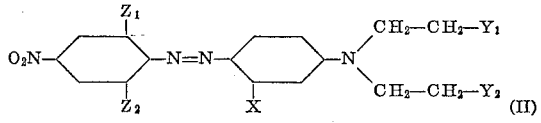

and

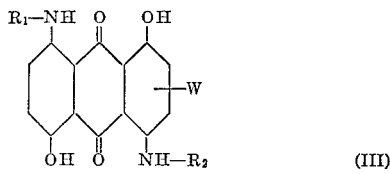

In these formulae $A_1$ represents chlorine or bromine,
$A_2$ and $A_3$ represent chlorine, bromine or hydrogen, at least one of $A_2$ or $A_3$ being hydrogen,
X represents hydrogen, methyl, ethyl or chlorine,
$Y_1$ represents hydrogen, a low molecular alkyl radical, an acetoxy or propionyloxy radical or the nitrile group,
$Y_2$ represents an acetoxy or propionyloxy radical, a carbomethoxy group, or a carboethoxy group or the nitrile group,
$Z_1$ represents chlorine, bromine, trifluoromethyl or the nitrile group,
$Z_2$ represents hydrogen, or when $Z_1$ is the nitrile group, hydrogen, chlorine or bromine,
$R_1$ and $R_2$ represent hydrogen or a low molecular alkyl radical, and
W represents chlorine, bromine, alkoxy, hydroxyaryl or alkoxy aryl, such as hydroxyphenyl or alkoxyphenyl.

Here and in the following, the term "alkyl" refers to low molecular alkyl, i.e. alkyl radicals with up to 4 or more especially to 2 carbon atoms.

The term "polyesters" refers particularly to linear polycondensation products of aromatic dicarboxylic acids, e.g. terephthalic acid and glycols, especially ethylene glycol, which are marketed under the registered trade marks Terylene, Dacron, Tergal, Trevira, Diolen, Terital or Teron (Fortrel), and also to modified polyesters, e.g. the fibers marketed under the registered trade marks Vycron, Kodel and Dacron 64. The term "cellulose acetate" covers secondary acetate and triacetate. The brown, grey and olive dyeings obtained are fast to light, gas fumes, pressing, pleating and sublimation, and have very good fastness to washing and perspiration even in heavy shades. Heavy shades are dyed level thanks to the excellent building-up properties of the mixtures.

Dyeing preparations on this basis preserve cellulosic and animal fibers to a great extent, and if these fibers are slightly stained these can be easily cleaned. The dyeing preparations may of course contain the usual additives such as standardizing agents.

In general the dyeing preparations of the instant invention may contain 35 to 70 parts of a dye of general Formula I, 5 to 35 parts of a dye of general Formula II, and 10 to 60 parts of a dye of general Formula III.

A red-brown dye mixture, for example, is prepared with 50 to 70 parts of a dye of general Formula I, 15 to 35 parts of a dye of general Formula II and 10 to 20 parts of a dye of general Formula III.

A dark brown dye mixture is obtained with 40 to 60 parts of a dye of general Formula I, 12 to 35 parts of a dye of general Formula II and 20 to 35 parts of a dye of general Formula III.

A grey dye mixture is prepared with 35 to 40 parts of a dye of ge neral Formula I, 5 to 15 parts of a dye of general Formula II and 45 to 60 parts of a dye of general Formula III (parts =parts by weight).

As dispersing agents, the anionic compounds used for this purpose are especially suitable.

A. The following are enumerated as examples of dyes of general Formula I:

(1) 4-nitro-2,6-dichloro-4'-(N-cyanoethyl-N-acetoxyethyl)-amino-1,1'-azobenzene,
(2) nitro-2,6-dibromo-4'-(N-cyanoethyl-N-acetoxyethyl)-amino-1,1'-azobenzene,
(3) 4-nitro-2,6-dichloro-4'-(N-cyanoethyl-N-ethyl)-amino-1,1'-azobenzene,
(4) 4-nitro-2,6-dibromo-4'-(N-cyanoethyl-N-ethyl)-amino-1,1'-azobenzene,
(5) 4-nitro-2,6-dichloro-4'-(N,N-bis-cyanoethyl)-amino-1,1'-azobenzene,
(6) 4-nitro-2,6-dichloro-4'-(N,N-bis-acetoxyethyl)-amino-1,1'-azobenzene,
(7) 4-nitro-2,6-dibromo-4'-(N,N-bis-acetoxyethyl)-amino-1,1'-azobenzene,
(8) 4-nitro-2,6-dichloro-4'-(N,N-bis-propionyloxyethyl)-amino-1,1'-azobenzene,
(9) 4-nitro-2,6-dichloro-4'-(N-cyanoethyl-N-carbomethoxyethyl)-amino-1,1'-azobenzene,
(10) 4-nitro-2,6-dibromo-4'-(N-cyanoethyl-carbomethoxyethyl)-amino-1,1'-azobenzene,
(11) 4-nitro-2,6-dichloro-2'-methyl-4'-(N-cyanoethyl-N-acetoxyethyl)-amino-1,1'-azobenzene,
(12) 4-nitro-2,6-dichloro-2'-methyl-4'(N-N-bis-acetoxyethyl)-amino-1,1'-azobenzene,
(13) 4-nitro-2,6-dichloro-2'-methyl-4'-(N-N-bis-cyanoethyl)-amino-1,1'-azobenzene,
(14) 4-nitro-2,6-dichloro-4'-(N-cyanoethyl-N-carboethoxyethyl)-amino-1,1'-azobenzene,

(15) 4-nitro-2,6-dichloro-4'-(N-cyanoethyl-N-propionyl-oxyethyl)-amino-1,1'-azobenzene,
(16) 4-nitro-2,5-dichloro-4'-(N-cyanoethyl-N-acetoxy-ethyl)-amino-1,1'-azobenzene,
(17) 4-nitro-2,5-dichloro-4'-(N-cyanoethyl-N-ethyl)-amino-1,1'-azobenzene,
(18) 4-nitro-2,5-dibromo-4'-(N-cyanoethyl-N-ethyl)-amino-1,1'-azobenzene.

B. The following are examples of dyes of general Formula II:

(1) 4-nitro-2-cyano-4'-(N-cyanoethyl-N-acetoxyethyl)-amino-1,1'-azobenzene,
(2) 4-nitro-2-chloro-4'-(N-cyanoethyl-N-acetoxyethyl)-amino-1,1'-azobenzene,
(3) 4-nitro-2-bromo-4'-(N-cyanoethyl-N-acetoxyethyl)-amino-1,1'-azobenzene,
(4) 4-nitro-2-cyano-6-chloro-4'-(N-cyanoethyl-N-acetoxyethyl)-amino-1,1'-azobenzene,
(5) 4-nitro-2-cyano-6-bromo-4'-(N-cyanoethyl-N-acetoxyethyl)-amino-1,1'-azobenzene,
(6) 4-nitro-2-cyano-4'-(N-ethyl-N-cyanoethyl)-amino-1,1'-azobenzene,
(7) 4-nitro-2-trifluoromethyl-4'-(N-cyanoethyl-N-acetoxyethyl)-amino-1,1'-azobenzene,
(8) 4-nitro-2-cyano-4'-(N,-bis-cyanoethyl)-amino-1,1'-azobenzene,
(9) 4-nitro-2-chloro-4'-(N,N-bis-cyanoethyl)-amino-1,1'-azobenzene,
(10) 4-nitro-2-trifluoromethyl-4'-(N-ethyl-N-cyanoethyl)-amino1,1'-azobenzene,
(11) 4-nitro-2-cyano-4'-(cyanoethyl-N-carbomethoxyethyl)-amino-1,1'-azobenzene,
(12) 4-nitro-2-bromo-4'-(N-cyanoethyl-N-carbomethoxyethyl)-amino-1,1'-azobenzene,
(13) 4-nitro-2-chloro-4'-(N-cyanoethyl-N-carbomethoxyethyl)-amino-1,1'-azobenzene,
(14) 4-nitro-2-cyano-6-chloro-4'-(N-cyanoethyl-N-carbomethoxyethyl)-amino-1,1'-azobenzene,
(15) 4-nitro-2-cyano-2'-methyl-4'-(N-cyanoethyl-N-carbomethoxyethyl)-amino-1,1'-azobenzene,
(16) 4-nitro-2-cyano-2'-methyl-4'-(N-cyanoethyl-N-carboethoxyethyl)-amino-1,1'-azobenzene,
(17) 4-nitro-2-cyano-2'-methyl-4'-(N,N-bis-cyanoethyl)-amino-1,1'-azobenzene,
(18) 4-nitro-2-cyano-2'-methyl-4'(N-ethyl-N-cyanoethyl)-amino-1,1'-azobenzene,
(19) 4-nitro-2-cyano-2'-methyl-4'-(N,N-bis-acetoxyethyl)-amino-1,1'-azobenzene,
(20) 4-nitro-2-cyano-2'-methyl-4'-(N-cyanoethyl-N-propionyl-oxyethyl)-amino-1,1'-azobenzene,
(21) 4-nitro-2-chloro-2'-methyl-4'-(N-cyanoethyl-N-acetoxyethyl)-amino-1,1'-azobenzene,
(22) 4-nitro-2-cyano-4'-(N-cyanoethyl-N-butyl)-amino-1,1'-azobenzene,
(23) 4-nitro-2-cyano-2'-methyl-4'-(N-cyanoethyl-N-ethyl)-amino-1,1'-azobenzene,
(24) 4-nitro-2-cyano-6-bromo-4'-(N,N-bis-acetoxyethyl)-amino-1,1'-azobenzene, C. Examples of suitable dyes of the general Formula (III) are:

(1) 1-amino-2-bromo-4,8-dihydroxy-5-methylaminoanthraquinone,
(2) 1-amino-2-chloro-4,8-dihydroxy-5-methylaminoanthraquinone,
(3) 1-amino-2-bromo-4,8-dihydroxy-5-ethylaminoanthraquinone,
(4) 1,5-diamino-2-bromo-4,8-dihydroxyanthraquinone,
(5) 1,5-diamino-2-chloro-4,8-dihydroxyanthraquinone,
(6) 1,5-diamino-2-(4'-ethoxy)-phenyl-4,8-dihydroxyanthraquinone,
(7) 1,5-diamino-2-(4'-methoxy)-phenyl-4,8-dihydroxy-anthraquinone,
(8) 1,5-diamino-2(4'-hydroxy)-phenyl-4,8-dihydroxyanthraquinone,
(9) A technical mixture of $C_6$ and $C_8$,
(10) A technical mixture of $C_7$ and $C_8$,
(11) 1,5-dimethylamino-2-methoxy-4,8-dihydroxyanthraquinone,
(12) 1,5-diethylamino-2-ethoxy-4,8-dihydroxyanthraquinone,
(13) 1-amino-2-methoxy-4,8-dihydroxy-5-methylaminoanthraquinone,
(14) 1,5-diamino-2-ethoxy-4,8-dihydroxy-anthraquinone.

In the examples the parts are by weight and the temperatures in degrees centigrade.

Example 1

3.6 parts of 4-nitro-2,6-dichloro-4'-(N-cyanoethyl-N-acetoxy-ethyl)-amino-1,1'-azobenzene, 2.25 parts of 4-nitro-2-cyano-4'-(N-cyano-ethyl-N-acetoxyethyl) - amino-1,1'-azobenzene, 1.45 parts of 1-amino-2-bromo-4,8-dihydroxy-5-methylaminoanthraquinone, 4 parts of sodium dinaphthylmethane disulfonate, 4 parts of sodium cetylsulfate and 5 parts of anhydrous sodium sulfate are ground in a ball mill to a fine powder in 48 hours.

2.4 parts of the dyeing preparation obtained are pasted and dispersed with a little water and the dispersion added through a sieve to a dyebath set with 0.5 gram per liter of lauryl-alcohol sulfonate. The liquor ratio is 1:40 but it may vary within wide limits. 100 parts of a pre-scoured fabric of Dacron polyester fiber are entered at 40–50°, the dyebath slowly heated and, after the addition of 5 milliliters per liter dyebath of an emulsion of a chlorinated benzene in water, dyeing is continued for 1–2 hours at 95–100°. The fabric is then rinsed, soaped, rinsed again and dried. It is dyed a reddish brown shade which is fast to light, cross-dyeing, washing, water, sea water, perspiration, gas fumes, sublimation, heat setting and pleating, and is white dischargeable.

In place of 100 parts of Dacron, 100 parts of Terital, Dralon, Trevira or Kodel polyester fiber can be dyed in the same way in reddish brown shades with the same good fastness properties.

The 4 - nitro-2,6-dichloro-4'-(N-cyanoethyl-N-acetoxyethyl)-amino-1,1'-azobenzene is produced as follows: 83 parts of 2,6-dichloro-4-nitro-1-aminobenzene are added to nitrosylsulfuric acid prepared with 450 parts of concentrated sulfuric acid and 28.5 parts of sodium nitrite. The mass is stirred for 4 hours at room temperature, then discharged into 1400 parts of water and 2400 parts of ice and the slight excess of nitrous acid destroyed with amido sulfonic acid. To the clear diazo solution is added a solution of 76 parts of N-cyanoethyl-N-hydroxyethyl-aniline in 50 parts of 30% hydrochloric acid and 30 parts of ice. Coupling takes place instantaneously. The dye suspension formed is stirred for 1 hour, diluted with 7000 parts of water, filtered, washed free of acid and dried.

50 parts of the 2,6-dichloro-4-nitro-4'-(N-cyanoethyl-N-hydroxyethyl)-amino-1,1'-azobenzene thus obtained and 200 parts of acetic anhydride are heated at the boil for 2 hours. On cooling, small amounts of an impurity are filtered off and the filtrate diluted with 750 parts of ethylalcohol. The dye then crystallized out.

Example 2

4 parts of 4-nitro - 2,6 - dichloro-4'-(N-cyanoethyl-N-acetoxyethyl)-amino-1,1'-azobenzene, 0.9 part of 4-nitro-2 - cyano-4'-(N - cyanoethyl-N-acetoxyethyl)-amino-1,1'-azobenzene, 4.5 parts of 1,5-diamino-2-bromo-4,8-dihydroxyanthraquinone, 10 parts of sulfite cellulose waste powder and 80 parts of water are ground in the wet state in a ball mill for 48 hours. The paste obtained is jet dried. 1 part of the resulting dyeing preparation is added to 1000 parts of water at 40–50°. 100 parts of scoured Terylene polyester fiber are entered in this bath, which is heated slowly to 120–130° and dyeing continued at this temperature under static pressure for about 30 minutes. The dyed goods are rinsed, soaped, rinsed and dried. They are dyed in a blue-grey shade with similar fastness properties to the dyeing produced with the dye mixture of Example 1.

Example 3

A mixture is prepared with 5.7 parts of 4-nitro-2,6-dichlorido-4'-(N-cyanoethyl-N-acetoxyethyl)-amino-1,1'-azobenzene, 1.6 parts of 4-nitro-2-cyano-4'-(N-ethyl-N-cyanoethyl)-amino-1,1'-azobenzene, 2.6 parts of a technical mixture of 1,5-diamino-2-(4'-hydroxy)-phenyl-4,8-dihydroxyanthraquinone and 1,5-diamino-2-(4'-ethoxy)-phenyl-4,8-dihydroxyanthraquinone in the form of the undried filter press cake, 10 parts of Turkey red oil and enough water to make up to 200 parts. After 2 hours the paste formed is mixed with 5 parts of 2-hydroxy-1,1'-diphenyl and 2000 parts of water. 100 parts of Tergal (registered trademark) polyester fiber fabric are entered in this dyebath at 40–50°, dyed for 1 hour at the boil and then rinsed. A dark brown dyeing with excellent fastness properties is obtained. Dye penetration of the fiber is good.

Example 4

4.8 parts of 4-nitro-2,6-dichloro-4'-(N-cyanoethyl-N-acetoxyethyl)-amino-1,1'-azobenzene, 1 part of 4-nitro-2-cyano-4'-(N-ethyl-N-cyanoethyl)-amino-1,1'-azobenzene, 1.1 parts of a technical mixture of 1,5-diamino-2-(4'-hydroxy)-phenyl-4,8-dihydroxyanthraquinone and 1,5-diamino-2-(4'-ethoxy)-phenyl-4,8-dihydroxyanthraquinone, 38 parts of sodium dinaphthylmethanedisulfonate and 530 parts of water are ground for 48 hours in a ball mill. The colloidal solution formed is mixed with 25 parts of dioxethylated n-butanol and 400 parts of 6% carboxymethyl cellulose. This printing paste is highly suitable for the Vigoureux or mélange printing of polyester fiber slubbing, e.g. Diolen (registered trademark). It is printed from two rollers giving a coverage of 76% and, without intermediate drying, the printed slubbing is steamed at 115–120°. Reddish brown prints of good fastnesses are obtained.

In the following table are listed further mixtures which can be prepared according to the details given in Examples 1 to 4.

| Example | Dye of Formula I | Dye of Formula II | Dye of Formula III | Shade on polyester fibers (IV) |
|---|---|---|---|---|
| 5 | 50 parts $A_1$ | 32 parts $B_4$ | 20 parts $C_1$ | Red-brown. |
| 6 | 50 parts $A_1$ | 30 parts $B_{11}$ | 20 parts $C_1$ | Do. |
| 7 | 50 parts $A_1$ | 32 parts $B_{15}$ | 20 parts $C_1$ | Do. |
| 8 | 50 parts $A_1$ | 32 parts $B_1$ | 18 parts $C_9$ | Do. |
| 9 | 50 parts $A_1$ | 13 parts $B_6$ | 10.5 parts $C_{10}$ | Do. |
| 10 | 50 parts $A_2$ | 32 parts $B_1$ | 18 parts $C_9$ | Do. |
| 11 | 50 parts $A_2$ | 30 parts $B_{11}$ | 20 parts $C_1$ | Do. |
| 12 | 50 parts $A_2$ | 32 parts $B_{15}$ | 20 parts $C_1$ | Do. |
| 13 | 60 parts $A_3$ | 30 parts $B_2$ | 18 parts $C_9$ | Do. |
| 14 | 60 parts $A_3$ | 30 parts $B_3$ | 18 parts $C_9$ | Do. |
| 15 | 60 parts $A_4$ | 32 parts $B_4$ | 20 parts $C_2$ | Do. |
| 16 | 65 parts $A_5$ | 23 parts $B_5$ | 12 parts $C_4$ | Do. |
| 17 | 50 parts $A_6$ | 30 parts $B_7$ | 20 parts $C_3$ | Do. |
| 18 | 50 parts $A_7$ | 30 parts $B_8$ | 20 parts $C_3$ | Do. |
| 19 | 50 parts $A_8$ | 30 parts $B_9$ | 20 parts $C_4$ | Do. |
| 20 | 55 parts $A_9$ | 30 parts $B_{10}$ | 20 parts $C_4$ | Do. |
| 21 | 55 parts $A_{10}$ | 20 parts $B_{12}$ | 20 parts $C_5$ | Do. |
| 22 | 50 parts $A_{11}$ | 32 parts $B_{11}$ | 20 parts $C_6$ | Do. |
| 23 | 50 parts $A_{12}$ | 30 parts $B_{13}$ | 15 parts $C_7$ | Do. |
| 24 | 50 parts $A_{13}$ | 35 parts $B_{14}$ | 20 parts $C_8$ | Do. |
| 25 | 50 parts $A_{14}$ | 35 parts $B_{16}$ | 15 parts $C_9$ | Do. |
| 26 | 50 parts $A_{15}$ | 35 parts $B_{17}$ | 18 parts $C_{10}$ | Do. |
| 27 | 50 parts $A_{16}$ | 35 parts $B_{18}$ | 18 parts $C_{10}$ | Do. |
| 28 | 50 parts $A_{17}$ | 35 parts $B_{19}$ | 18 parts $C_{10}$ | Do. |
| 29 | 50 parts $A_{12}$ | 25 parts $B_{20}$ | 18 parts $C_{10}$ | Do. |
| 30 | 50 parts $A_1$ | 35 parts $B_{21}$ | 18 parts $C_{10}$ | Do. |
| 31 | 50 parts $A_3$ | 20 parts $B_{22}$ | 18 parts $C_{10}$ | Do. |
| 32 | 50 parts $A_{17}$ | 20 parts $B_{23}$ | 18 parts $C_{10}$ | Do. |
| 33 | 50 parts $A_{17}$ | 13 parts $B_6$ | 10.5 parts $C_{10}$ | Do. |
| 34 | 50 parts $A_{12}$ | 13 parts $B_6$ | 10.5 parts $C_{10}$ | Do. |
| 35 | 50 parts $A_{15}$ | 35 parts $B_{16}$ | 15 parts $C_{11}$ | Do. |
| 36 | 50 parts $A_1$ | 13.5 parts $B_6$ | 22 parts $C_{10}$ | Dark-brown. |
| 37 | 50 parts $A_1$ | 20 parts $B_4$ | 30 parts $C_1$ | Do. |
| 38 | 50 parts $A_1$ | 20 parts $B_{11}$ | 30 parts $C_1$ | Do. |
| 39 | 50 parts $A_1$ | 22 parts $B_{15}$ | 30 parts $C_1$ | Do. |
| 40 | 50 parts $A_1$ | 22 parts $B_1$ | 30 parts $C_9$ | Dark brown. |
| 41 | 50 parts $A_2$ | 16 parts $B_1$ | 30 parts $C_{10}$ | Do. |
| 42 | 50 parts $A_2$ | 15 parts $B_{11}$ | 30 parts $C_1$ | Do. |
| 43 | 50 parts $A_2$ | 16 parts $B_{15}$ | 30 parts $C_4$ | Do. |
| 44 | 50 parts $A_3$ | 15 parts $B_2$ | 25 parts $C_9$ | Do. |
| 45 | 50 parts $A_3$ | 15 parts $B_3$ | 25 parts $C_{10}$ | Do. |
| 46 | 50 parts $A_4$ | 17 parts $B_4$ | 32 parts $C_2$ | Do. |
| 47 | 50 parts $A_6$ | 15 parts $B_7$ | 35 parts $C_3$ | Do. |
| 48 | 50 parts $A_7$ | 15 parts $B_8$ | 33 parts $C_3$ | Do. |
| 49 | 50 parts $A_8$ | 15 parts $B_9$ | 30 parts $C_4$ | Do. |
| 50 | 50 parts $A_9$ | 15 parts $B_{10}$ | 30 parts $C_4$ | Do. |
| 51 | 50 parts $A_{10}$ | 15 parts $B_{12}$ | 30 parts $C_5$ | Do. |
| 52 | 50 parts $A_{11}$ | 15 parts $B_{11}$ | 25 parts $C_6$ | Do. |
| 53 | 50 parts $A_{12}$ | 15 parts $B_{13}$ | 20 parts $C_7$ | Do. |
| 54 | 50 parts $A_{13}$ | 17 parts $B_{17}$ | 30 parts $C_8$ | Do. |
| 55 | 50 parts $A_{14}$ | 17 parts $B_{16}$ | 20 parts $C_9$ | Do. |
| 56 | 50 parts $A_{15}$ | 17 parts $B_{17}$ | 22 parts $C_{10}$ | Do. |
| 57 | 50 parts $A_{16}$ | 17 parts $B_{18}$ | 22 parts $C_{10}$ | Do. |
| 58 | 50 parts $A_{17}$ | 17 parts $B_{19}$ | 22 parts $C_{10}$ | Do. |
| 59 | 50 parts $A_{12}$ | 17 parts $B_{20}$ | 22 parts $C_{10}$ | Do. |
| 60 | 50 parts $A_1$ | 17 parts $B_{21}$ | 22 parts $C_{10}$ | Do. |
| 61 | 50 parts $A_3$ | 12 parts $B_{22}$ | 22 parts $C_{10}$ | Do. |
| 62 | 50 parts $A_{17}$ | 12 parts $B_{23}$ | 22 parts $C_{10}$ | Do. |
| 63 | 50 parts $A_{12}$ | 13.5 parts $B_6$ | 22 parts $C_{10}$ | Do. |
| 64 | 50 parts $A_{17}$ | 13.5 parts $B_6$ | 22 parts $C_{10}$ | Do. |
| 65 | 50 parts $A_5$ | 17 parts $B_5$ | 35 parts $C_4$ | Do. |
| 66 | 50 parts $A_{11}$ | 15 parts $B_{11}$ | 35 parts $C_{12}$ | Do. |
| 67 | 50 parts $A_1$ | 12.8 parts $B_6$ | 61 parts $C_{10}$ | Grey. |
| 68 | 50 parts $A_1$ | 17 parts $B_4$ | 65 parts $C_1$ | Do. |
| 69 | 50 parts $A_1$ | 17 parts $B_{11}$ | 65 parts $C_1$ | Do. |
| 70 | 50 parts $A_1$ | 18 parts $B_{15}$ | 65 parts $C_1$ | Do. |
| 71 | 50 parts $A_1$ | 18 parts $B_1$ | 65 parts $C_{10}$ | Do. |
| 72 | 50 parts $A_2$ | 18 parts $B_1$ | 65 parts $C_9$ | Do. |
| 73 | 50 parts $A_2$ | 15 parts $B_{11}$ | 65 parts $C_1$ | Do. |
| 74 | 50 parts $A_2$ | 15 parts $B_{15}$ | 65 parts $C_4$ | Do. |
| 75 | 50 parts $A_3$ | 14 parts $B_2$ | 60 parts $C_9$ | Do. |
| 76 | 50 parts $A_3$ | 14 parts $B_3$ | 62 parts $C_{10}$ | Do. |
| 77 | 50 parts $A_4$ | 15 parts $B_4$ | 65 parts $C_2$ | Do. |
| 78 | 50 parts $A_6$ | 13 parts $B_7$ | 65 parts $C_3$ | Do. |
| 79 | 50 parts $A_7$ | 12 parts $B_8$ | 65 parts $C_3$ | Do. |
| 80 | 50 parts $A_8$ | 12 parts $B_9$ | 60 parts $C_4$ | Do. |
| 81 | 50 parts $A_9$ | 12 parts $B_{10}$ | 60 parts $C_4$ | Do. |
| 82 | 50 parts $A_{12}$ | 12 parts $B_{13}$ | 60 parts $C_7$ | Do. |
| 83 | 50 parts $A_{14}$ | 14 parts $B_{16}$ | 60 parts $C_9$ | Do. |
| 84 | 50 parts $A_{15}$ | 14 parts $B_{17}$ | 64 parts $C_{10}$ | Do. |
| 85 | 50 parts $A_{16}$ | 14 parts $B_{18}$ | 64 parts $C_{10}$ | Do. |
| 86 | 50 parts $A_{17}$ | 14 parts $B_{19}$ | 62 parts $C_{10}$ | Do. |
| 87 | 50 parts $A_{12}$ | 14 parts $B_{20}$ | 60 parts $C_{10}$ | Do. |
| 88 | 50 parts $A_1$ | 14 parts $B_{21}$ | 61 parts $C_{10}$ | Do. |
| 89 | 50 parts $A_3$ | 12 parts $B_{22}$ | 62 parts $C_{10}$ | Do. |
| 90 | 50 parts $A_{17}$ | 12 parts $B_{23}$ | 62 parts $C_{10}$ | Do. |
| 91 | 50 parts $A_{17}$ | 13.5 parts $B_6$ | 62 parts $C_{10}$ | Do. |
| 92 | 50 parts $A_{12}$ | 13.5 parts $B_6$ | 6 parts $C_{10}$ | Do. |
| 93 | 50 parts $A_5$ | 12 parts $B_5$ | 60 parts $C_4$ | Do. |
| 94 | 50 parts $A_{10}$ | 12 parts $B_{12}$ | 65 parts $C_5$ | Do. |
| 95 | 50 parts $A_{11}$ | 12 parts $B_{11}$ | 60 parts $C_6$ | Do. |
| 96 | 50 parts $A_{13}$ | 12 parts $B_{17}$ | 65 parts $C_8$ | Do. |
| 97 | 50 parts $A_6$ | 13 parts $B_7$ | 65 parts $C_{13}$ | Do. |
| 98 | 50 parts $A_{12}$ | 12 parts $B_{13}$ | 60 parts $C_{14}$ | Do. |

Particularly good dyeings are obtained with the following mixtures:

50–70 parts $A_1$, 15–35 parts $B_6$ and 10–20 parts $C_{10}$.
50–70 parts $A_{12}$, 15–35 parts $B_{13}$ and 10–20 parts $C_7$;
50–70 parts $A_{17}$, 15–35 parts $B_{19}$ and 10–20 parts $C_{10}$;
40–60 parts $A_1$, 12–35 parts $B_6$ and 20–35 parts $C_{10}$.
40–60 parts $A_{12}$, 12–35 parts $B_{20}$ and 20–35 parts $C_{10}$;
40–60 parts $A_{17}$, 12–35 parts $B_{23}$ and 20–35 parts $C_{10}$;
35–45 parts $A_1$, 5–15 parts $B_6$ and 45–60 parts $C_{10}$;
35–45 parts $A_{12}$, 5–15 parts $B_{13}$ and 45–60 parts $C_7$;
35–45 parts $A_{17}$, 5–15 parts $B_{23}$ and 45–60 parts $C_{10}$.

Example 99

A fine aqueous dispersion of 17 parts of the dye mixture described in Example 1, 48 parts of sodium dinaphthylmethane disulfonatae and 25 parts of butyl carbitol in 50 parts of water are mixed with 500 parts of crystal gum 1:2, 30 parts of glycerine and 320 parts of water. The paste obtained is printed in the normal way and the print steamed at 1.5 to 1.7 atmospheres, rinsed, soaped and dried. Red-brown, sharp-edged prints with excellent fastness properties are obtained on cellulose triacetate fabrics.

Example 100

A fine aqueous dispersion of 15 parts of the dye mixture described in Example 4, 35 parts of sodium dinaphthylmethane disulfonate and 2 parts of alginate is run into 1000 parts of water. A polyester fiber fabric is padded with this liquor in the normal way at 20–70°, air dried at 60–100°, treated with dry air at 180–220° for 30–90 seconds, and finally rinsed, soaped and dried. Level reddish brown dyeings having good fastness properties are obtained.

*Example 101*

100 parts of secondary cellulose acetate are dyed in a dyebath set with 1.3 parts of a dyeing preparation containing 30% 4 - nitro-2,6-dichloro-4'-(N-cyanoethyl-N-acetoxy-ethyl)-amino-1,1'-azobenzene, 0.8 part of a dyeing preparation containing 25% 4-nitro-2-cyano-2'-(N-cyanoethyl-N-acetoxyethyl)-amino-1,1'-azobenzene and 0.3 part of a dyeing preparation containing 30% 1,5-diamino - 2 - bromo-4,8-dihydroxy - anthraquinone. Red-brown shades of good fastness are obtained.

In order to illustrate the criticality of the combination of dyes disclosed and claimed herein, tests were conducted utilizing various combinations of dyes. The results of these tests are set forth below and reveal that 8 commercial yellow to yellow-brown or yellow-orange dyestuffs yield light fast dyeings on polyester fiber material, but that only the four dyestuffs which are claimed as yellow components for the production of grey dyeings yield light fast grey dyeings in admixture with a red dyestuff and a blue dyestuff, whereas the other four yellow dyestuffs, which are not claimed, yield grey dyeings which are not fast to light and which fade to blue.

I. The following test dyestuffs and dyestuff mixtures were used:

(a) The yellow-brown monoazo dystuff of the formula

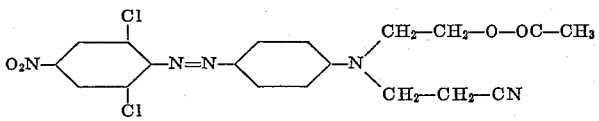

*Dyestuff I*

The red monoazo dyestuff of the formula

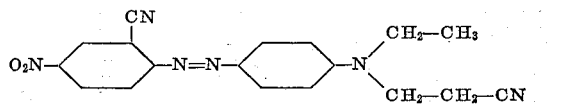

*Dyestuff II*

The technical mixture of the blue anthraquinone dyestuffs of the formulae

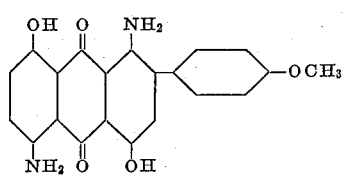

*Dyestuff III* and

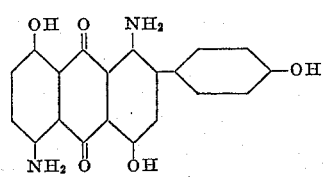

*Dyestuff IV*

The yellow-brown monoazo dyestuff of the formula

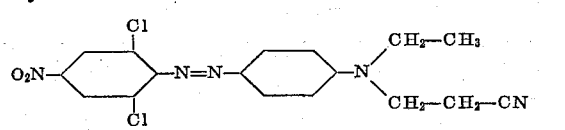

*Dyestuff XI*

The yellow-brown monoazo dyestuff of the formula

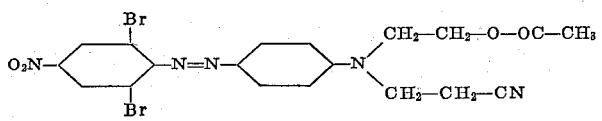

*Dyestuff XII*

The yellow-orange monoazo dyestuff of the formula

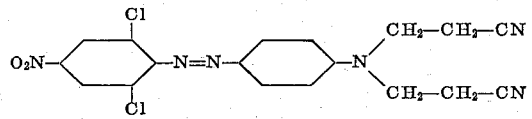

*Dyestuff XIII*

The yellow monoazo dyestuff of the formula

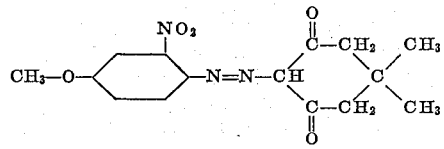

*Dyestuff XIV*

The yellow monoazo dyestuff of the U.S. Patent No. 2,864,816 of the formula

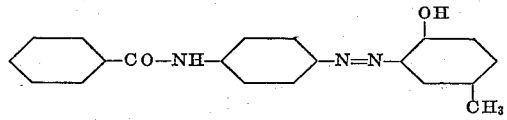

*Dyestuff XV*

The yellow monoazo dyestuff C.I. Dispense Yellow 8 (Color Index, Second Edition, 1956, volume 1, p. 1962) of the formula

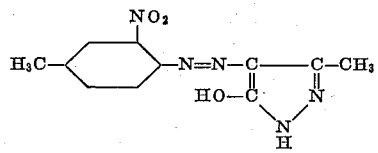

*Dyestuff XVI* the yellow monoazo dyestuff C.I. Disperse Yellow 20 (Color Index, Second Edition, 1956, volume 1, p. 1667) of the formula

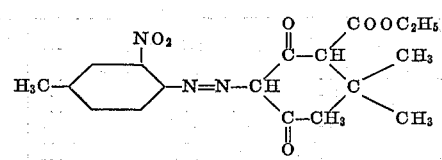

*Dyestuff XVII*

(b) *Dyestuff Mixture A*.—The grey dyestuff mixture containing the yellow-brown monoazo dyestuff (I), the red monoazo dyestuff (II) and the technical mixture of the blue anthraquinone dyestuffs (III) and (IV).

*Dyestuff Mixture B*.—The grey dyestuff mixture containing the yellow-brown monoazo dyestuff (XI), the red monoazo dyestuff (II) and the technical mixture of the blue anthraquinone dyestuffs (III) and (IV).

*Dyestuff Mixture C*.—The grey dyestuff mixture containing the yellow-brown monoazo dyestuff (XII), the red monoazo dyestuff (II) and the technical mixture of the blue anthraquinone dyestuffs (III) and (IV).

*Dyestuff Mixture D*.—The grey dyestuff mixture containing the yellow-orange monoazo dyestuff (XIII), the red monoazo dyestuff (II) and the technical mixture of the blue anthraquinone dyestuffs (III) and (IV).

*Dyestuff Mixture E*.—The grey dyestuff mixture containing the yellow monoazo dyestuff (XIV), the red monoazo dyestuff (II) and the technical mixture of the blue anthraquinone dyestuffs (III) and (IV).

*Dyestuff Mixture F.*—The grey dyestuff mixture containing the yellow monoazo dyestuff (XV), the red monoazo dyestuff (II) and the technical mixture of the blue anthraquinone dyestuffs (III) and (IV).

*Dyestuff Mixture G.*—The grey dyestuff mixture containing the yellow monoazo dyestuff (XVI), the red monoazo dyestuff (II) and the technical mixture of the blue anthraquinone dyestuffs (III) and (IV).

*Dyestuff Mixture H.*—The grey dyestuff mixture containing the yellow monoazo dyestuff (XVII), the red monoazo dyestuff (II) and the technical mixture of blue anthraquinone dyestuffs (III) and (IV).

II. Test procedure: Testing the fastness to artificial light of the dyeing on "Diolen" polyester fiber material obtained with the yellow to yellow-brown or yellow-orange monoazo dyestuffs (I) and (XI) to (XVII), and of the dyeings obtained with the grey dyestuff mixtures A to H.

(a) The yellow to yellow-brown or yellow-orange dyeings on "Diolen" were prepared in the following manner:

(1) The dyestuff under examination (I) and (XI) to (XVII) was mixed with an equal weight of sodium dinaphthylmethanedisulfonate and 8 times its weight of water. The mixture was ground in a roller mill for 48 hours. A fine dyestuff preparation was obtained.

(2) 0.35 to 0.9 part (in order to obtain dyeings of comparable tinctorial strength) of these dyeing preparations were pasted with a little cold, soft water, mixed with about 400 parts of cold, soft water containing 0.3 part of sulfonated castor oil with a degree of sulfonation of 80% and stirred in order to obtain a fine suspension. This is added to a solution of 1.2 parts of sulfonated caster oil with a degree of sulfonation of 80% in 3600 part of water at 40–50° C. After the addition of 20 parts of an emulsion of chlorinated benzene, 100 parts of a scoured fabric of the Diolen material were introduced into the dyebath which was slowly heated to 100° C. and maintained for 1 hour at 100° C. The dyed Diolen was then removed from the liquor, rinsed with water, treated for 15 minutes at 70° C. in a solution of 0.2 part of octylphenldecaglycol ether (35%) in 200 parts of water, removed, rinsed again and dried at 60° C.

(b) The grey dyeings on Diolen were produced in the following manner:

0.07 to 0.13 part of the red monoazo dyestuff (II).
0.23 to 0.40 part of the technical mixture of the blue anthraquinone dystuffs (III) and (IV), and
0.15 to 0.33 part of the yellow to yellow-brown or yellow-orange monoazo dyestuffs (I) and (XI) to (XVII), were mixed in a ratio to yield grey dyeings of comparable tinctorial strength. These mixtures were used for the production of dyestuff preparations in the manner described in section a(1). The dyebaths and dyeings were prepared as described in section a(2).

(c) Light fastness test: The fastness to artificial light of the yellow to yellow-brown or yellow-orange dyeings obtained according to section (a) and of the grey dyeings obtained according to section (b) was examined.

The test was executed with the Xenon arc lamp "Xenotest–WL" made by Quarzlampen GmbH, Hanau, Germany. The exposure to light was of 50 hours' duration. One part each dyeings was covered with black carboard enabling this part of the specimen to be unaffected by the exposure and thus to retain the shade of the original dyeings, whereas the uncovered part showed the shade of the dyeing exposed to light.

The dyestuffs (I) and (XI) to (XVII) yielded yellow to yellow-brown or yellow-orange dyeings on Diolen which were fast to artificial light when exposed for 50 hours. The dyestuffs (I) and (XI) to (XIII) used in admixture with the red monoazo dyestuff (II) and the blue anthraquinone dyestuffs (III) and (IV) yielded grey dyeings which were fast to artificial light when tested under identical conditions, and the dyestuffs (XIV) to (XVII) in admixture with the dyestuffs (II), (III) and (IV) yielded grey dyeings which were not fast to artificial light and which faded to blue when tested under identical conditions.

The eight commercial yellow to yellow-brown or yellow-orange dyestuffs (I) and (XI) to (XVII) are valuable dyestuffs when applied alone to polyester fiber material, but only the dyestuffs (I), (XI), (XII) and (XIII) can be used as a yellow component for the production of light fast grey dyeings on the same fiber material, whereas the grey dyeings produced with the dyestuffs XIV to XVII as yellow components are not fast to light.

What is claimed is:

1. Dyestuff composition which comprises dyes of the general formulae

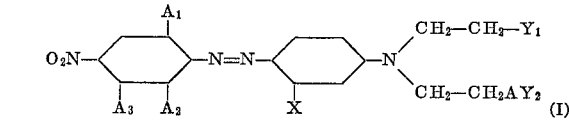

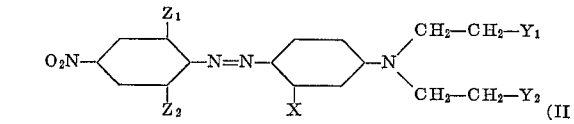

and

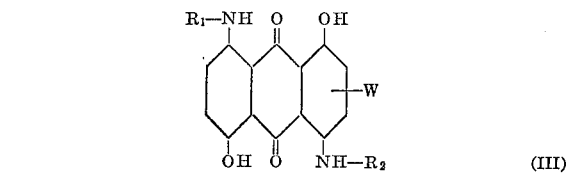

wherein $A_1$ represents a halogen atom selected from the class consisting of chlorine and bromine, $A_2$ and $A_3$ represent members selected from the class consisting of hydrogen, chlorine and bromine, one of $A_2$ and $A_3$ being hydrogen, X represents a member selected from the class consisting of methyl and ethyl, chlorine and hydrogen, $Y_1$ represents a member selected from the class consisting of hydrogen, a low molecular alkyl radical, an acetoxy radical, a propionyloxy radical and the nitrile group, $Y_2$ represents a member selected from the class consisting of an acetoxy radical, a propionyloxy radical, carbomethoxy, carboethoxy, and the nitrile group, $Z_1$ represents a member selected from the class consisting of chlorine, bromine, the trifluoromethyl group and the nitrile group, $Z_2$ represents a member selected from the group consisting of hydrogen, chlorine and bromine when $Z_1$ represents the nitrile group and represents hydrogen when $Z_1$ represents a member selected from the group consisting of chlorine, bromine and trifluoromethyl group, $R_1$ and $R_2$ represent members selected from the class consisting of hydrogen and low molecular alkyl radical and W represents a member selected from the class consisting of chlorine, bromine, alkoxy radicals, hydroxyaryl radicals and alkoxyaryl radicals.

2. Dyestuff composition according to claim 1, which comprises 50–70 parts of a dye of general Formula I, 15–35 parts of a dye of general Formula II and 10–20 parts of a dye of general Formula III.

3. Dyestuff composition according to claim 1, which comprises 40–60 parts of a dye of general Formula I, 12–35 parts of a dye of general Formula II and 20–35 parts of a dye of general Formula III.

4. Dyestuff composition according to claim 1, which comprises 35-45 parts of a dye of general Formula I, 5-15 parts of a dye of general Formula II and 45-60 parts of a dye of general Formula III.

5. A process for dyeing fibers of polyester which comprises applying to said fibers a dyestuff composition which comprises dyes of the general formulae

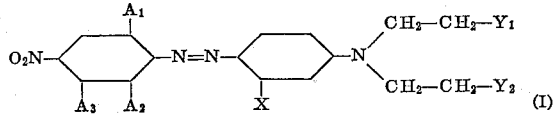

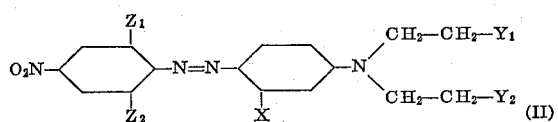

and

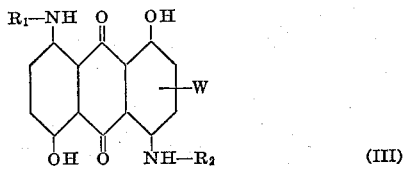

wherein $A_1$ represents a halogen atom selected from the class consisting of chlorine and bromine, $A_2$ and $A_3$ represent members selected from the class consisting of hydrogen, chlorine and bromine, one of $A_2$ and $A_3$ being hydrogen, X represents a member selected from the class consisting of methyl and ethyl, chlorine and hydrogen, $Y_1$ represents a member selected from the class consisting of hydrogen, a low molecular alkyl radical, an acetoxy radical, a propionyloxy radical and the nitrile group, $Y_2$ represents a member selected from the class consisting of an acetoxy radical, a propionyloxy radical, carbomethoxy, carboethoxy and the nitrile group, $Z_1$ represents a member selected from the class consisting of chlorine, bromine, the trifluoromethyl group and the nitrile group, $Z_2$ represents a member selected from the group consisting of hydrogen, chlorine and bromine when $Z_1$ represents the nitrile group and represents hydrogen when $Z_1$ represents a member selected from the group consisting of chlorine, bromine and the trifluoromethyl group, $R_1$ and $R_2$ represent members selected from the class consisting of hydrogen and low molecular alkyl radical and W represents a member selected from the class consisting of chlorine, bromine, alkoxy radicals, hydroxyaryl radicals and alkoxyaryl radicals.

6. A process of dyeing fibers of cellulose acetate which comprises applying to said fibers a dyestuff composition which comprises dyes of the general formulae

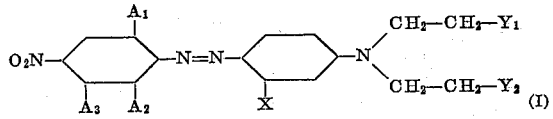

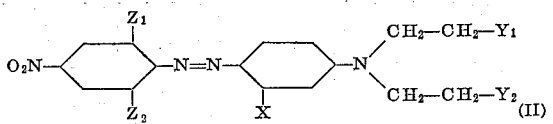

and

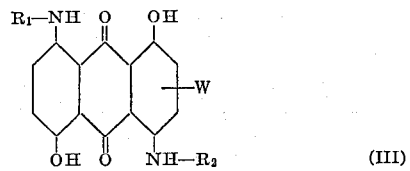

wherein $A_1$ represents a halogen atom selected from the class consisting of chlorine and bromine, $A_2$ and $A_3$ represent members selected from the class consisting of hydrogen, chlorine and bromine, one of $A_2$ and $A_3$ being hydrogen, X represents a member selected from the class consisting of methyl and ethyl, chlorine and hydrogen, $Y_1$ represents a member selected from the class consisting of hydrogen, a low molecular alkyl radical, an acetoxy radical, a propionyloxy radical and the nitrile group, $Y_2$ represents a member selected from the class consisting of an acetoxy radical, a propionyloxy radical, carbomethoxy, carboethoxy and the nitrile group, $Z_1$ represents a member selected from the class consisting of chlorine, bromine, the trifluoromethyl group and the nitrile group, $Z_2$ represents a member selected from the group consisting of hydrogen, chlorine and bromine when $Z_1$ represents the nitrile group and represents hydrogen when $Z_1$ represents a member selected from the group consisting of chlorine, bromine and the trifluoromethyl group, $R_1$ and $R_2$ represent members selected from the class consisting of hydrogen and low molecular alkyl radical and W represents a member selected from the class consisting of chlorine, bromine, alkoxy radicals, hydroxyaryl radicals and alkoxyaryl radicals.

7. Fibers of polyester dyed with a dyestuff composition according to claim 1.

8. Fibers of cellulose acetate dyed with a dyestuff composition according to claim 1.

References Cited by the Examiner

UNITED STATES PATENTS

| | | |
|---|---|---|
| 2,782,187 | 2/57 | Sartori. |
| 2,891,942 | 6/59 | Merian _____ 260—207.1 |
| 2,989,363 | 6/61 | Hartmann. |
| 2,990,413 | 6/61 | Gehrke. |
| 3,042,478 | 7/62 | Merian. |
| 3,122,410 | 2/64 | Mueller. |

NORMAN G. TORCHIN, *Primary Examiner.*

UNITED STATES PATENT OFFICE
CERTIFICATE OF CORRECTION

Patent No. 3,207,568

September 21, 1965

Urs Lerch et al.

It is hereby certified that error appears in the above numbered patent requiring correction and that the said Letters Patent should read as corrected below.

Column 2, line 36, for "ge neral" read -- general --; column 4, line 1, for "-2(4'-" read -- -2-(4'- --; column 8, line 35, for "Dispense" read -- Disperse --; line 36, for "p. 1962" read -- p. 1662 --; same column 8, lines 50 to 58, the formula should appear as shown below instead of as in the patent:

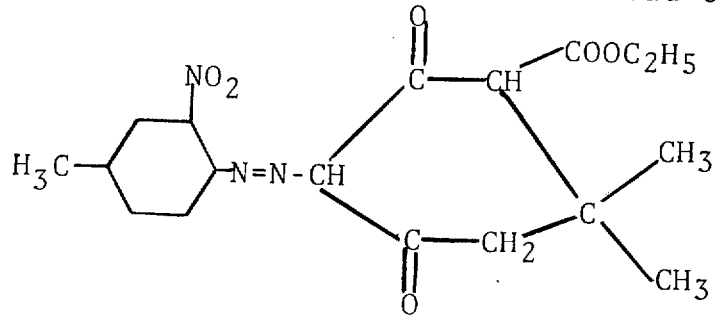

column 9, line 42, for "octylphenldecaglycol" read -- octylphenyldecaglycol --; column 10, lines 18 to 23, the formula should appear as shown below instead of as in the patent:

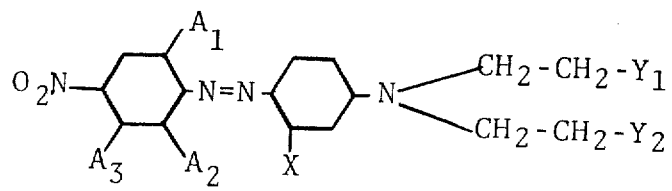

same column 10, line 28, for "(II" read -- (II) --.

Signed and sealed this 10th day of May 1966.

(SEAL)
Attest:

ERNEST W. SWIDER
Attesting Officer

EDWARD J. BRENNER
Commissioner of Patents